US012352946B1

(12) United States Patent
Nehmetallah et al.

(10) Patent No.: US 12,352,946 B1
(45) Date of Patent: Jul. 8, 2025

(54) FOURIER PTYCHOGRAPHIC MICROSCOPE SYSTEMS AND METHODS

(71) Applicant: United States of America as represented by the Administrator of NASA, Washington, DC (US)

(72) Inventors: George Nehmetallah, Washington, DC (US); Shahid Aslam, Washington, DC (US); Thuc Phan, Washington, DC (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 105 days.

(21) Appl. No.: 18/066,524

(22) Filed: Dec. 15, 2022

(51) Int. Cl.
*G02B 21/36* (2006.01)
*G02B 21/08* (2006.01)
*G02B 21/14* (2006.01)
*G06T 3/4046* (2024.01)
*G06T 3/4053* (2024.01)

(52) U.S. Cl.
CPC ......... *G02B 21/365* (2013.01); *G02B 21/086* (2013.01); *G02B 21/14* (2013.01); *G06T 3/4046* (2013.01); *G06T 3/4053* (2013.01)

(58) Field of Classification Search
CPC .... G02B 21/365; G02B 21/086; G02B 21/14; G06T 3/4046; G06T 3/4053
See application file for complete search history.

(56) References Cited

U.S. PATENT DOCUMENTS

| 11,347,045 | B2 * | 5/2022 | Cohen | G02B 21/0084 |
| 2016/0088205 | A1 * | 3/2016 | Horstmeyer | H04N 23/95 348/80 |
| 2017/0024908 | A1 * | 1/2017 | Bosch | G02B 21/008 |
| 2017/0146788 | A1 * | 5/2017 | Waller | G06T 19/20 |
| 2017/0371141 | A1 * | 12/2017 | Besley | G06T 3/4076 |

(Continued)

FOREIGN PATENT DOCUMENTS

| EP | 4332876 A1 * | 3/2024 | G06T 3/4046 |
| EP | 4400894 A1 * | 7/2024 | G02B 21/06 |

(Continued)

*Primary Examiner* — John R Schnurr
(74) *Attorney, Agent, or Firm* — Derek J. Langdon; Matthew F. Johnston; Trenton J. Roche

(57) ABSTRACT

Imaging devices, methods, and systems are disclosed. The disclosure includes a Fourier Ptychographic Microscope ("FPM") compatible for integration to a Microfluidic Device ("MD") to perform wide Field-of-View ("FoV"), high spatial resolution imaging (<1 μm), for biosignature detection and motility in liquid samples, for use, without limitation, as a space-based payload. Fourier ptychography ("FP") algorithms adapted for reconstruction are disclosed. A processor board and camera combined with FP algorithms adapted for reconstruction are used to computationally reconstruct sub-micron resolution images. In certain embodiments, a dual-modality portable FPM performs wide FoV, high lateral and axial resolution imaging, and high-resolution birefringence imaging, for biosignature detection and motility in liquid samples. Various combinations of the disclosed devices, methods, and systems may be employed, depending on the particular requirements of each implementation.

34 Claims, 12 Drawing Sheets

(56) References Cited

U.S. PATENT DOCUMENTS

| | | | |
|---|---|---|---|
| 2019/0391382 A1* | 12/2019 | Chung | G02B 21/367 |
| 2021/0148824 A1* | 5/2021 | Lee | G02B 21/367 |
| 2021/0208427 A1* | 7/2021 | Lee | G02B 5/3025 |
| 2021/0260582 A1* | 8/2021 | Ohno | G01N 37/00 |
| 2022/0254538 A1* | 8/2022 | Zheng | G02B 27/58 |
| 2022/0350123 A1* | 11/2022 | Engel | G02B 21/06 |
| 2022/0351347 A1* | 11/2022 | Yang | G02B 21/367 |
| 2022/0401954 A1* | 12/2022 | Angeles | G01N 35/00029 |
| 2023/0179876 A1* | 6/2023 | Dai | G02B 21/367 348/79 |

FOREIGN PATENT DOCUMENTS

| | | | | |
|---|---|---|---|---|
| WO | WO-2021052992 A1 * | 3/2021 | | |
| WO | WO-2021053374 A1 * | 3/2021 | | G02B 21/06 |
| WO | WO-2023217844 A1 * | 11/2023 | | G02B 21/367 |

* cited by examiner

400

FOURIER PTYCHOGRAPHIC MICROSCOPE SYSTEMS AND METHODS

ORIGIN OF INVENTION

The invention described herein was made in the performance of work under a NASA contract and by an employee of the United States Government and is subject to Public Law 96-517 (35 U.S.C. § 5200 et seq.). The contractor has not elected to retain title to the invention.

FIELD OF THE DISCLOSURE

This disclosure relates generally to digital imaging. More particularly, certain embodiments relate to a dual-modality portable Fourier Ptychographic Microscope ("FPM") compatible for integration to a Microfluidic Device ("MFD") to perform wide Field-of-View ("FOV"), high lateral and axial resolution imaging, and high-resolution birefringence imaging, for biosignature detection and motility in liquid samples. Previously filed provisional application No. 63/177,022 entitled, "Portable Fourier Ptychographic Microscope With Deep Learning Capability For Detection of Biosignatures" filed on Apr. 20, 2021 is hereby incorporated by reference in tis entirely.

GENERAL BACKGROUND

An Ocean World is a planet or other celestial body that contains a substantial amount of water. Some potential Ocean Worlds in the solar system, other than the Earth, include some of the moons of Jupiter and Saturn, including Callisto, Enceladus, Europa, Ganymede, and Titan. A current science priority for planetary exploration is to search for potential biosignatures in Ocean Worlds (where a biosignature is any characteristic, element, molecule, substance, or feature that can be used as evidence for past or present life).

In this pursuit, it is important to determine what constitutes a biosignature across multiple spatial scales, and how this compares with abiosignatures formed by nonliving processes (where an abiosignature is a substance, object, or pattern that has a non-biological origin). Several different microscope technologies known to skilled artisans can be adapted to resolve and characterize microscale biosignatures in Ocean World samples. These include visible microscopy, deep ultraviolet microscopy, flow cytometry, atomic force microscopy, and scanning electron microscopy.

For Ocean World biosignature detection microscopy needs, it is desirable to capture high spatial resolution images of particles to identify features 0.2 μm in size and at abundances of 100 cells/cc in a 5-cc volume sample. Microscopy-based biosignature detection systems to satisfy these requirements combine a sample processing system interfacing with sample observation technology. A variety of optical processing methodologies are available, including phase change using pressure to convert ice to a liquid, followed by sample concentration. Also, biomineralization reactions between microbial life and the geosphere of a planetary body can result in incorporation of microorganisms into the geological record as body fossils or casts that can appear macroscopic (>1 mm in scale). Certain biofabrics such as microbiolites (e.g., stromatolites, thrombolites) and biofilms may also be large enough to be resolved at the 100 μm scale, if not larger, depending on the habitat. The observation of macroscopic morphological features could serve as a compelling biosignature, especially when coupled with detailed organic and inorganic chemical analyses.

As an example, the Europa Lander Study 2016 Report described two baseline model payloads for life detection: (i) a deep ultra-violet ("UV") resonance Raman and fluorescence spectrometer with optical microscope, and (ii) a gas chromatograph mass spectrometer with both chirality analysis and stable isotope analyzer. Thus, there is a need to provide microscopy-based biosignature detection systems having small size and mass that integrate neatly into a time-resolved Raman and fluorescence spectrometer, for example. It is therefore desirable to address the limitations in the known art by means of the systems and methods described herein.

BRIEF DESCRIPTION OF THE DRAWINGS

By way of example, reference will now be made to the accompanying drawings, which are not to scale.

DETAILED DESCRIPTION

Those of ordinary skill in the art will realize that the following description of the present invention is illustrative only and not in any way limiting. Other embodiments of the invention will readily suggest themselves to such skilled persons upon their having the benefit of this disclosure. Reference will now be made in detail to specific implementations of the present invention, as illustrated in the accompanying drawings. The same reference numbers will be used throughout the drawings and the following description to refer to the same or like parts.

Figure 1:
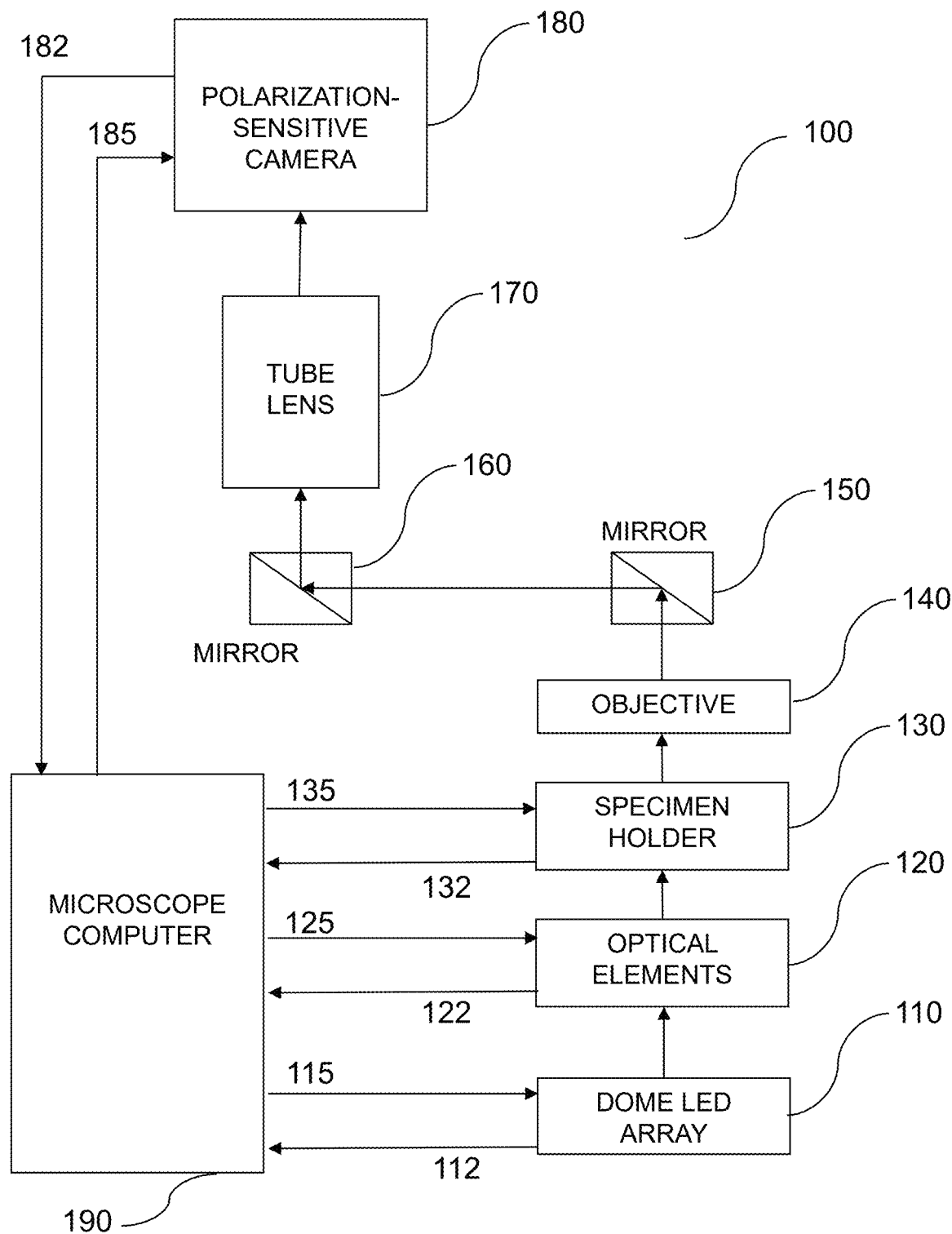
FIG. 1 depicts an exemplary block diagram of a Fourier ptychography microscope in accordance with aspects of certain embodiments of the present invention.

FIG. 1 depicts a schematic diagram of a compact FPM (100) in accordance with aspects of certain embodiments of the present invention. The components of FPM (100) are controlled by a microscope computer (190) with machine learning processing capability (e.g., commercially available NVIDIA Corporation Jetson™ Nano™ board). In certain embodiments requiring resistance to exposure to radiation and extreme temperatures (such as space-based interplanetary biosignature detection implementations), radiation-resistant processors such as the Tensor Processing Unit ("TPU") (commercially available from Google/Alphabet, Inc.) or the Movidius™ Myriad™ X Vision Processing Unit ("VPU") (commercially available from Intel Corporation) may be preferred.

As shown in FIG. 1, a pixelated polarization-sensitive camera (180) (e.g., Kiralux Polarization Camera, 5 MP Monochrome CMOS Sensor, USB 3.0 Interface, commercially available from Thorlabs) captures images corresponding to multiple illuminations of some or all of the lighting elements in a dome LED array (110), and transmits collected image data to a microscope computer (190) for further processing. The microscope computer (190) receives data from the polarization-sensitive camera via image data signals (182) and transmits control data to the camera (182) via camera control signals (185). Different diffracted orders of light distribution serve as the sub-complexed fields in the 2D Fourier domain and are stitched using a constrained iterative process to perform high-resolution reconstruction. The position of each lighting element in the dome LED array (110) determines where the Fourier transform of each captured image is stitched on the global Fourier domain. The LED positions based on setup coordinates are digitally calibrated in certain embodiments with an optimization method during the iterative process along with Fuzzy Cognitive Map ("FCM") techniques known to skilled artisans to force it to converge.

In certain embodiments, microscope computer (190) may also transmit control data to dome LED array (110) via dome LED array control signals (115), to optical elements (120) via optical element control signals (125), and to specimen holder (130) via specimen holder control signals (135). Depending on the requirements of each particular implementation, microscope computer (190) may also receive data from dome LED array (110) via dome LED data signals (112), from optical elements (120) via optical element data signals (122), and from specimen holder (130) via specimen holder data signals (132).

In certain embodiments, due to a combination of emission profiles, field vignetting by the objective window, and reduced distance from the illuminator to the specimen, a dome illuminator LED array (110) (e.g., commercially available SCI Microscopy Dome LED Array), provides significantly higher intensity at high numerical aperture ("NA"), as compared to a planar array. The domed arrangement, in certain embodiments, provides improvements in intensity uniformity and light throughput. Thus, the domed arrangement boosts the signal-to-noise ratio in the darkfield region in certain embodiments.

Figure 2A:
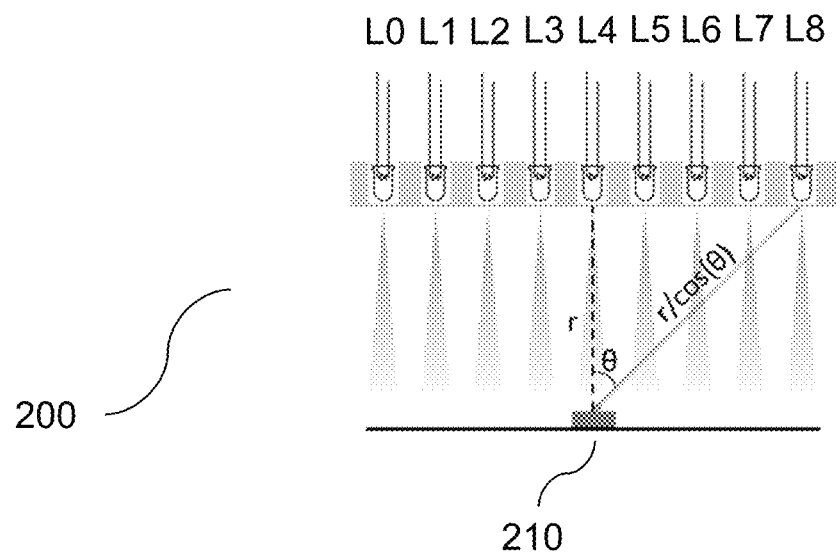
FIG. 2A depicts an exemplary linear arrangement of light-emitting diodes ("LEDs") in accordance with aspects of certain embodiments of the present invention.

FIG. 2A depicts an exemplary linear arrangement (200) of light emitting diodes (L0, L1, . . . , L8) in accordance with aspects of certain embodiments of the present invention. As shown in FIG. 2A, for a planar LED array, light intensity at the sample (210) can be related to the angle of illumination of each emitter by the following equation:

$$I_\theta \propto \cos^4 \theta,$$

where $\theta$ is the angle between the illumination vector and the optical axis.

Figure 2B:
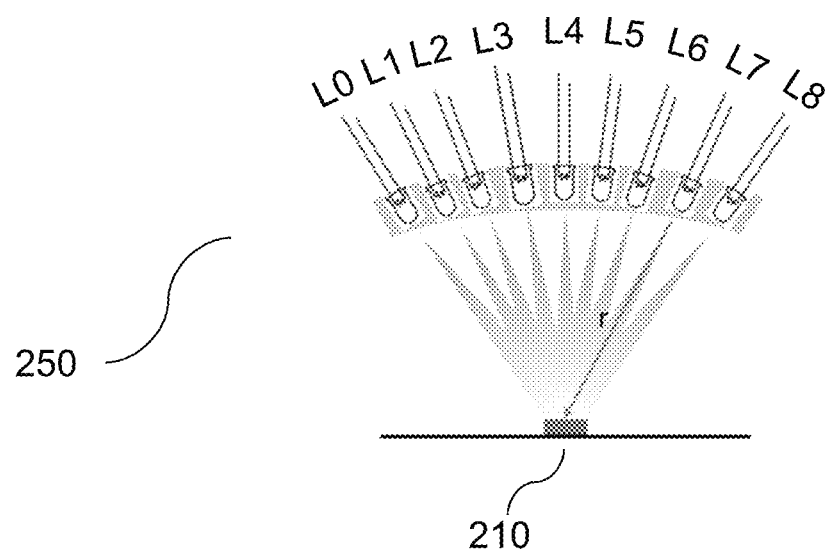
FIG. 2B depicts an exemplary circular arrangement of light-emitting diodes in accordance with aspects of certain embodiments of the present invention.

When the LEDs are arranged in a circular shape with respect to the sample/specimen (210) (see FIG. 2B), all factors except field vignetting by the objective window are removed, reducing the intensity falloff to:

$$I_\theta \propto \cos \theta.$$

Figure 3:
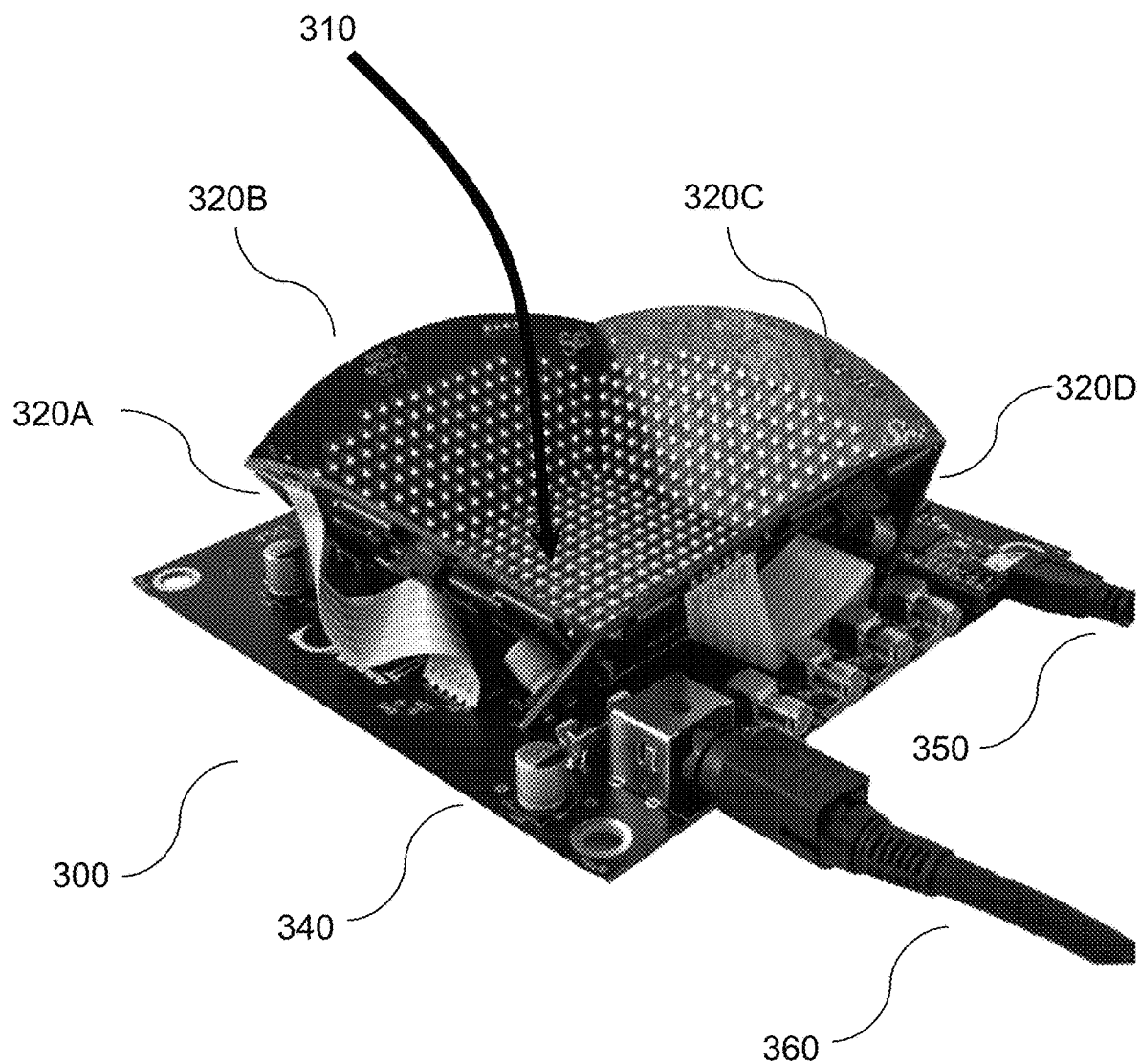
FIG. 3 depicts an exemplary dome light-emitting diode array in accordance with aspects of certain embodiments of the present invention.

Thus, the difference between geometries is proportional to $\cos^3 \theta$, or a factor of >50% at 40° and 99% at 77° incidence, having a substantial impact on decreasing the required exposure times in certain embodiments. Skilled artisans will readily recognize that the two-dimensional arrangements depicted in the line of LEDs in FIG. 2A can be extended to a three-dimensional planar arrangement, and that the two-dimensional circular arrangements of LEDs depicted in FIG. 2B can be extended to a three-dimensional semi-spherical or domed arrangement FIG. 3 depicts an exemplary dome light-emitting diode array in accordance with aspects of certain embodiments of the present invention (e.g., commercially available SCI Dome LED Array from SCI Microscopy). As shown in FIG. 3, certain embodiments comprise a programmable dome LED array (300) comprising five separate planar LED arrays (310, 320A, 320B, 320C, 320D) interfacing with a control circuit board (340) and input/output signals (350, 360), that can illuminate up to 0.80 NA with discrete control of each of the multiple RGB LEDs (Red: 630 nm, Green: 530 nm, and Blue: 485 nm) on the array. Dome LED array (300) as shown in FIG. 3 comprises a base planar LED array (310) and four angled LED arrays (320A, 320B, 320C, and 320D). Each of the angled "wing" LED arrays (320A, 320B, 320C, and 320D) comprises a planar LED array, but extends at an obtuse angle from base planar LED array (31). Thus, collectively, base planar LED array (310) and the four angled LED arrays (320A, 320B, 320C, and 320D) approximate a dome shape.

Referring back to FIG. 1, in certain embodiments, objective (140) comprises a 5× objective with 0.1 NA and a working distance of 25.4 mm (commercially available from Newport Corporation) placed above the specimen holder (130). In certain embodiments, this results in a larger synthetic NA of 0.9. Mirrors (150, 160) and a tube lens (170) are used to direct the light in certain embodiments from objective (140) to polarization-sensitive camera (180) in a compact physical configuration.

Still referring to FIG. 1, prior to illuminating a specimen located in specimen holder (130), the light from the dome LED array (110) passes through optical elements (120). In certain embodiments, optical elements (120) comprise a bandpass filter matched to the wavelength of one color (e.g., Red: 630 nm) of the LEDs of dome LED array (110), and further comprise a linear polarizer (LP) and liquid crystal variable retarders (LCRs) (controllable by microscope computer 190). This enables rapid capture of polarization images without any manual moving parts.

Thus, in certain embodiments, as shown in FIG. 1, prior to illuminating a specimen coupled to specimen holder (130), the light from dome LED array (110) is filtered by optical elements (120) to narrow its bandwidth and to improve temporal coherence, e.g., using red LEDs with a bandpass filter (e.g., FB630-10, commercially available from Thorlabs) to obtain a central wavelength of 630±2 nm, and a full-width half maximum of 10±2 nm. Then, the light is polarized according to a generator comprising a combination of a linear polarizer ("LP") and full-wavelength liquid crystal variable retarders ("LCRs") (e.g., LCC1423-A, commercially available from Thorlabs). This configuration of optical elements (120) provides versatility to result in different states of polarization (e.g., linear polarized light along different angles or circular or elliptic polarized light). In certain embodiments, the LCRs can be controlled by a liquid crystal controller (e.g., LCC25, commercially available from Thorlabs), with adjustable output voltage from 0 to 25 V RMS, and voltage resolution of 1 mV).

Figure 4:
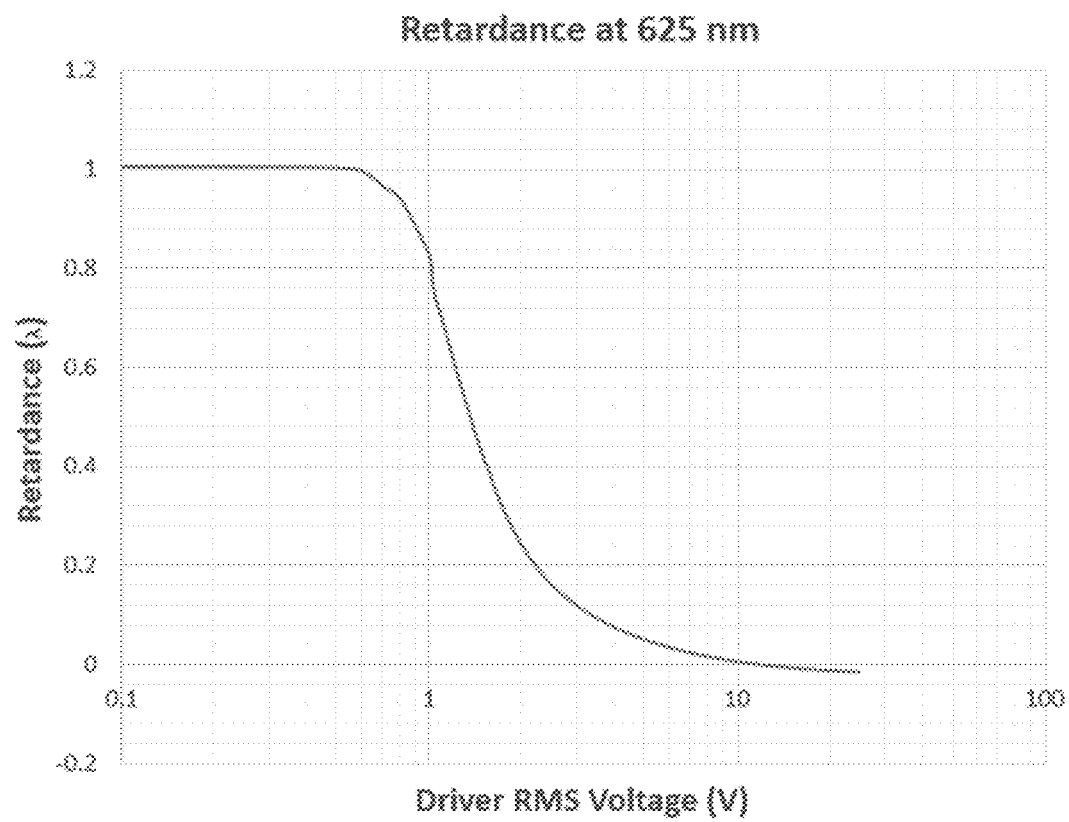
FIG. 4 depicts an exemplary graph of LCR retardance versus driving rms voltage in accordance with aspects of certain embodiments of the present invention.
Figure 4:
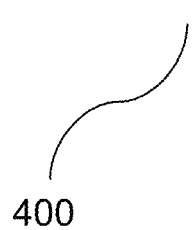

FIG. 4 depicts the relationship between the controlled driver RMS output voltage of an exemplary LCC25 controller (along the x-axis) and the resulting retardance in terms of wavelength when using red LEDs (along the y-axis) according to aspects of certain embodiments of the present invention. In certain embodiments, the resolution of rotation angle that may be achieved with the exemplary LCC25 controller is approximately 0.5 degrees.

In certain embodiments, microfluidic device ("MFD") technology known to skilled artisans is integrated into specimen holder (130) for examining liquid samples.

Referring back to FIG. 1, as light from dome LED array (110) passes through optical elements (120), this results in different states of polarization (e.g., linear polarized light along different angles or circular or elliptic polarized light). In certain embodiments, the light then passes through an optical system with an objective (140), mirrors (150, 160), and a tube lens (170) before it passes through a polarization filter array aligned at 0°, 45°, 90°, and 135°, which is included in front of the image sensor of a polarization-sensitive camera (180), allowing the data regarding each polarization state to be captured simultaneously. Using this polarization filter array in certain embodiments results in subsampling the image by a factor of 4×, and interpolation techniques known to skilled artisans may be used to estimate the missing values for each of the four polarization states.

After obtaining the reconstructed amplitude of the sample from different angles of the polarization filter array aligned at 0°, 45°, 90°, and 135° (denoted $I_0$, $I_{45}$, $I_{90}$, and $I_{135}$, respectively), the per-pixel 2×2 Jones matrix $J_s(\delta, \theta)$ for the specimen is modeled in certain embodiments as follows:

$$J_s(\delta, \theta) = \begin{bmatrix} \cos\frac{\delta}{2} + i\sin\frac{\delta}{2}\cos 2\theta & i\sin\frac{\delta}{2}\sin 2\theta \\ i\sin\frac{\delta}{2}\sin 2\theta & \cos\frac{\delta}{2} - i\sin\frac{\delta}{2}\cos 2\theta \end{bmatrix},$$

where the phase retardance $\delta$ is:

$$\delta = 2\sin^{-1}\sqrt{\frac{(2I_{90})^2 + (I_{45} - I_{135})^2}{4I_{90}(I_{45} + I_{135})}},$$

and the optic-axis orientation $\theta$ is:

$$\theta = \frac{1}{2}\tan^{-1}\left(\frac{2I_{90}}{I_{45} - I_{135}}\right).$$

In certain embodiments, the FPM (100), by itself, can be operated in a normal mode that acquires data and performs intensity, 3D phase, and 2D birefringence processing using traditional FPM methods known to skilled artisans with no deep learning ("DL") capability (where birefringence is the double refraction of light in a transparent, molecularly ordered material, which is manifested by the existence of orientation-dependent differences in refractive index).

Figure 5:
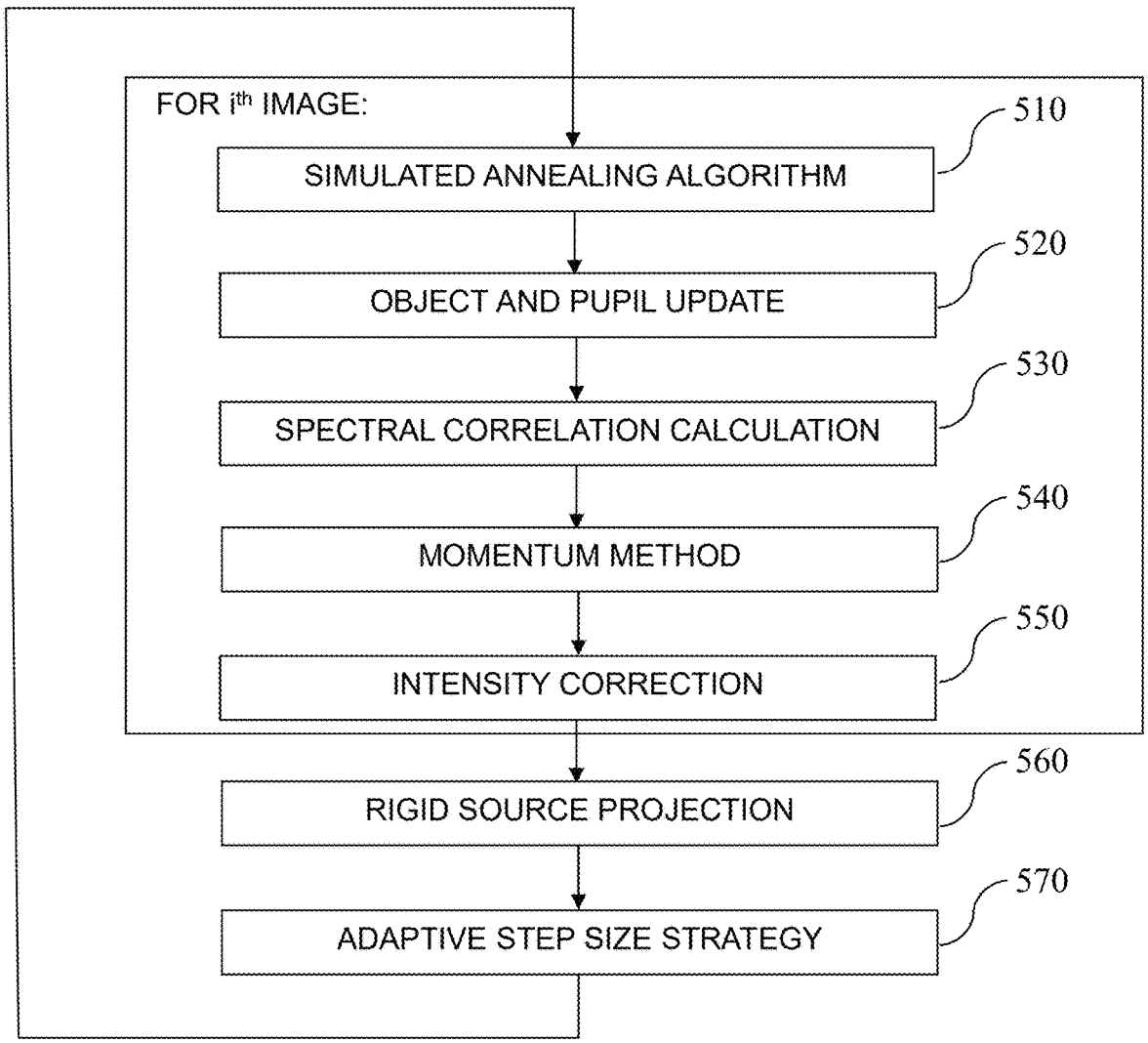
FIG. 5 depicts an exemplary flow chart for LED calibration and image reconstruction methods according to aspects of certain embodiments of the present invention.

The FPM algorithm shown in FIG. 5 depicts a block diagram for LED calibration and image reconstruction methods according to aspects of certain embodiments of the present invention, and is used to perform LED self-calibration and reconstruction for both thin and thick samples. By digitally calibrating the LED's position on each single illumination using the combination of simulated annealing, spectral correlation, and rigid source projection methods before stitching its NA-based filtered Fourier transform in the global Fourier domain, artifacts are significantly reduced, especially for near-edge regions.

As shown in FIG. 5, for each iteration m while convergence is not achieved, for each image i, calibration begins with a simulated annealing algorithm (510), followed by object and pupil update (520), spectral correlation calculation (530), momentum method (540), and intensity correction (550). This is followed by rigid source projection (560) and adaptive step size strategy (570) implementation. First, the simulated annealing algorithm (510) preliminarily corrects the LED positions based on minimizing the difference between the estimated sample and the measured sample considering the same LED position $k_i$:

$$E = \sum_{x,y} \left(|O_{est}^m(k_i) * P_{est}^m(k_i)|^2 - I_{mea}(k_i)\right)^2.$$

Then (step 520), the object $O_{est}(k_i)$ and pupil $P_{est}(k_i)$ functions are updated according to the new estimated LED positions $k_i + k_0$ as follows:

$$O_{est}^{m+1}(k_i) = O_{est}^m(k_i) + \frac{|P_{est}^m(k_i)|[P_{est}^m(k_i)] * \left[\sqrt{I_{mea}(k_i)} \angle [O_{est}^m(k_i + k_0) * P_{est}^m(k_i + k_0)] - O_{est}^m(k_i + k_0) * P_{est}^m(k_i + k_0)\right]}{|P_{est}^m(k_i)|_{max}\left(|P_{est}^m(k_i)|^2 + \alpha\right)}$$

and $$P_{est}^{m+1}(k_i) = P_{est}^m(k_i) + \frac{|O_{est}^m(k_i)|[O_{est}^m(k_i)] * \left[\sqrt{I_{mea}(k_i)} \angle [O_{est}^m(k_i + k_0) * P_{est}^m(k_i + k_0)] - O_{est}^m(k_i + k_0) * P_{est}^m(k_i + k_0)\right]}{|O_{est}^m(k_i)|_{max}\left(|O_{est}^m(k_i)|^2 + \beta\right)},$$

where $\alpha$, $\beta$ are regularization constants to ensure numerical stability.

Since certain embodiments require using many darkfield LEDs (which come from the high-angle illumination) to achieve high NA, spectral correlation ("SC") calibration is important. The SC calibration (step 530) estimates the illumination angle of each LED using local grid search. The optimal perturbation of illumination angle $k_i$ is solved over integer multiples $n=(n_x, n_y)$ of k-space resolution-limited steps $\Delta k$, such that the updated illumination position $k_i^{(m+1)} = k_i^{(m)} + n\Delta k$ minimizes the Euclidean distance between the object and illumination angle estimates and measurements.

Next, Nesterov momentum and intensity correction methods known to skilled artisans (steps 540 & 550) are used as described below to improve the convergence of the algorithm in certain embodiments:

$$\text{Initialize } v_{obj} = 0 \text{ and } v_{pupil} = 0$$
$$\text{If } m > 2 \text{ do}$$
$$v_{obj} = O_{est}^{m+1}(k_i) * v_{obj} + [O_{est}^{m+1}(k_i) - O_{est}^m(k_i)]$$
$$O_{est}^{m+1}(k_i) = O_{est}^m(k_i) + v_{obj}$$
$$v_{pupil} = P_{est}^{m+1}(k_i) * v_{pupil} + [P_{est}^{m+1}(k_i) - P_{est}^m(k_i)]$$
$$P_{est}^{m+1}(k_i) = P_{est}^m(k_i) + v_{pupil}$$

Because the dome LED array used in certain embodiments (e.g., dome LED array 300 shown in FIG. 3 has unequal distance between LEDs on the wing planes (320A, 320B, 320C, 320D) and LEDs on the base plane (310), it is necessary to impose an affine transformation (rigid source projection, step 560) from the angle map of LED positions on the board to the current estimates $k_i^{(m)}$. In such cases, the transformation matrix is:

$$M = \begin{bmatrix} 1 & 0 & 0 \\ 0 & 1 & 0 \\ t_x & t_y & 1 \end{bmatrix} \begin{bmatrix} s_x & 0 & 0 \\ 0 & s_y & 0 \\ 0 & 0 & 1 \end{bmatrix} \begin{bmatrix} 1 & sh_y & 0 \\ sh_x & 1 & 0 \\ 0 & 0 & 1 \end{bmatrix} \begin{bmatrix} \cos q & \sin q & 0 \\ -\sin q & \cos q & 0 \\ 0 & 0 & 1 \end{bmatrix},$$

where $t_x$, $t_y$ account for translation, $s_x$, $s_y$ account for scale, $sh_x$, $sh_y$ account for shear, and q is the rotation angle. This significantly reduces the problem dimensionality and mitigates noise across LEDs, making the reconstruction more stable. Finally, adaptive step size strategy (step 570) is used to help converge the algorithm quickly.

In certain embodiments, the FPM algorithm is coded in the Python language for compatibility with the implemented hardware. By digitally calibrating the LED's position on each single illumination using the combination of simulated annealing, spectral correlation, and rigid source projection methods before stitching its NA-based filtered Fourier transform in the global Fourier domain, artifacts are significantly reduced, especially for near-edge regions.

Figure 6:
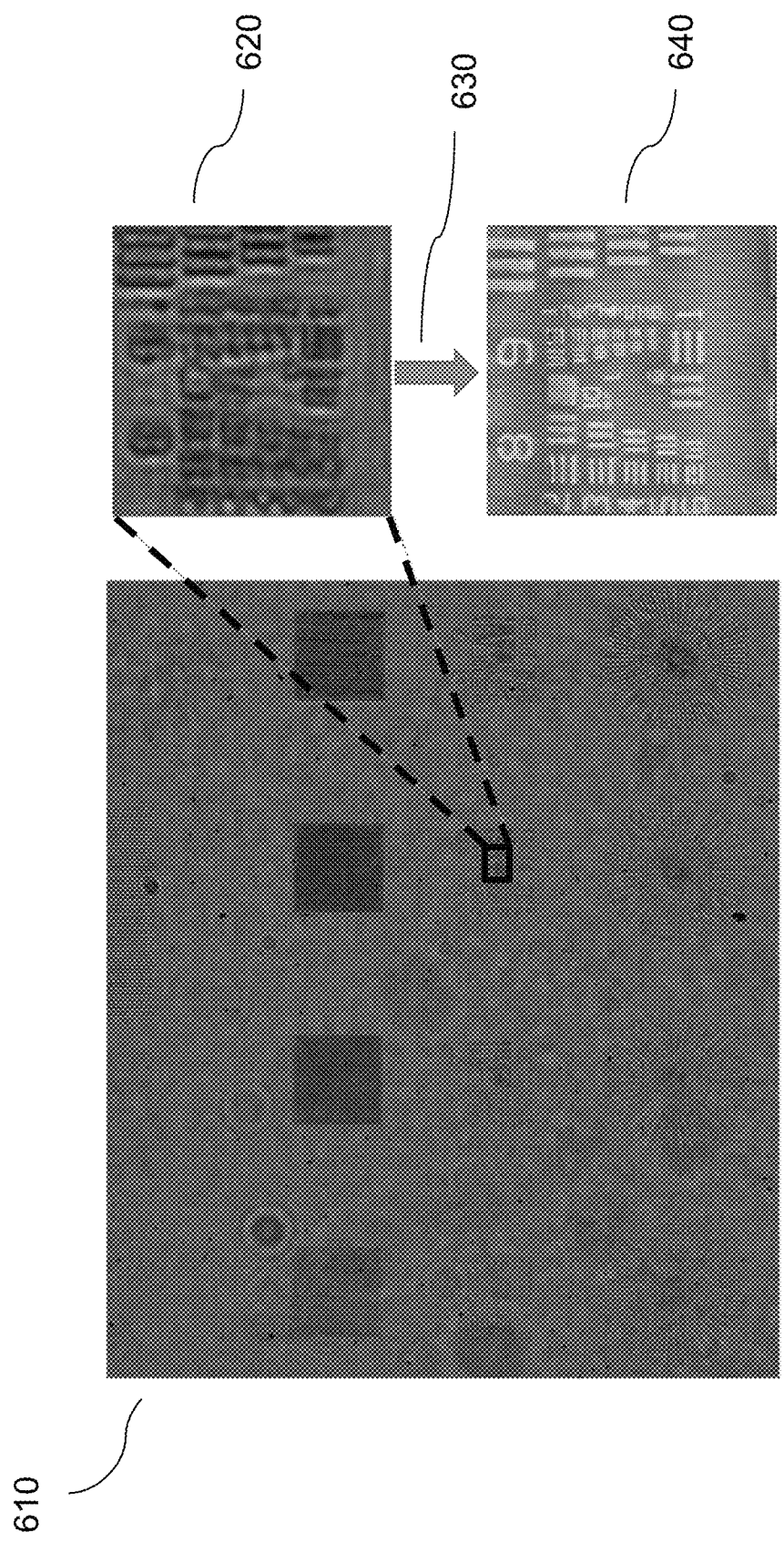
FIG. 6 depicts an exemplary intensity image captured by a polarization-sensitive camera in accordance with aspects of certain embodiments of the present invention, along with a zoom-in region of interest of that image and a resulting post-ptychography high-resolution reconstructed phase image in accordance with aspects of certain embodiments of the present invention.

FIG. 6 depicts an exemplary United States Air Force ("USAF") resolution test chart intensity image 610 captured by a polarization-sensitive camera (such as camera 180 depicted in FIG. 1) in accordance with aspects of certain embodiments of the present invention, along with a zoom-in region of interest of that image 620 and a resulting post-ptychography high-resolution reconstructed phase image 640 in accordance with aspects of certain embodiments of the present invention (after applying vectorial Fourier ptychography method as described herein at step 630). As depicted in FIG. 6, after obtaining the reconstructed amplitude of the sample from different angles of the polarization filter array aligned at 0°, 45°, 90°, and 135°, a vectorial Fourier ptychography method as described herein is used in certain embodiments to analyze the polarization system. This method recovers more polarization information, including phase retardance, diattenuation, and orientation, than previous methods known to skilled artisans. Moreover, by taking advantage of the setup configuration according to certain embodiments as described herein, imaging acquisition time is significantly decreased compared to previous techniques known to skilled artisans. For example, at the same location of the LED, prior art techniques require capturing four images manually at four different configurations of the generator and analyzer, whereas certain embodiments of the present invention require collecting only two images by electronically controlling the LCR at two different configurations (i.e., generator at 0°, and) 45°.

By considering four combinations of the generator and analyzer:

(G, A)=(0°, 0°), (45°, 45°), (0°, 90°), (45°, 135°), the vectorial model of a polarization system according to certain embodiments can be written as:

$$\begin{bmatrix} I_1 \\ I_2 \\ I_3 \\ I_4 \end{bmatrix} = \begin{bmatrix} F^{-1} & 0 & 0 & 0 \\ 0 & F^{-1} & 0 & 0 \\ 0 & 0 & F^{-1} & 0 \\ 0 & 0 & 0 & F^{-1} \end{bmatrix}$$

$$\begin{bmatrix} P_{xx} & 0 & P_{xy} & 0 \\ P_{xx}+P_{yx} & P_{xx}+P_{yx} & P_{xy}+P_{yy} & P_{xy}+P_{yy} \\ P_{yx} & 0 & P_{yy} & 0 \\ P_{xx}-P_{yx} & P_{xx}-P_{yx} & P_{xy}-P_{yy} & P_{xy}-P_{yy} \end{bmatrix} \begin{bmatrix} O_{xx} \\ O_{xy} \\ O_{yx} \\ O_{yy} \end{bmatrix},$$

where $l_1$, $l_2$, $l_3$, $l_4$ are vectorization notation for measurements in 4 cases, $F^{-1}$ is the 2D inverse Fourier transform matrix, and $$O = \begin{bmatrix} O_{xx} & O_{xy} \\ O_{yx} & O_{yy} \end{bmatrix}, P = \begin{bmatrix} P_{xx} & P_{xy} \\ P_{yx} & P_{yy} \end{bmatrix}$$

are the Jones matrices of the spectrum of the sample and pupil, respectively.

Using a sequential Gauss-Newton reconstruction algorithm, in certain embodiments the matrices O and P are recovered. Then, the eigenvalues $\xi_1$, and $\xi_2$ of the matrix O are computed. The amplitude-dependent diattenuation measurement is:

$$D = \left| \frac{|\xi_1|^2 - |\xi_2|^2}{|\xi_1|^2 + |\xi_2|^2} \right|.$$

Figure 8A:
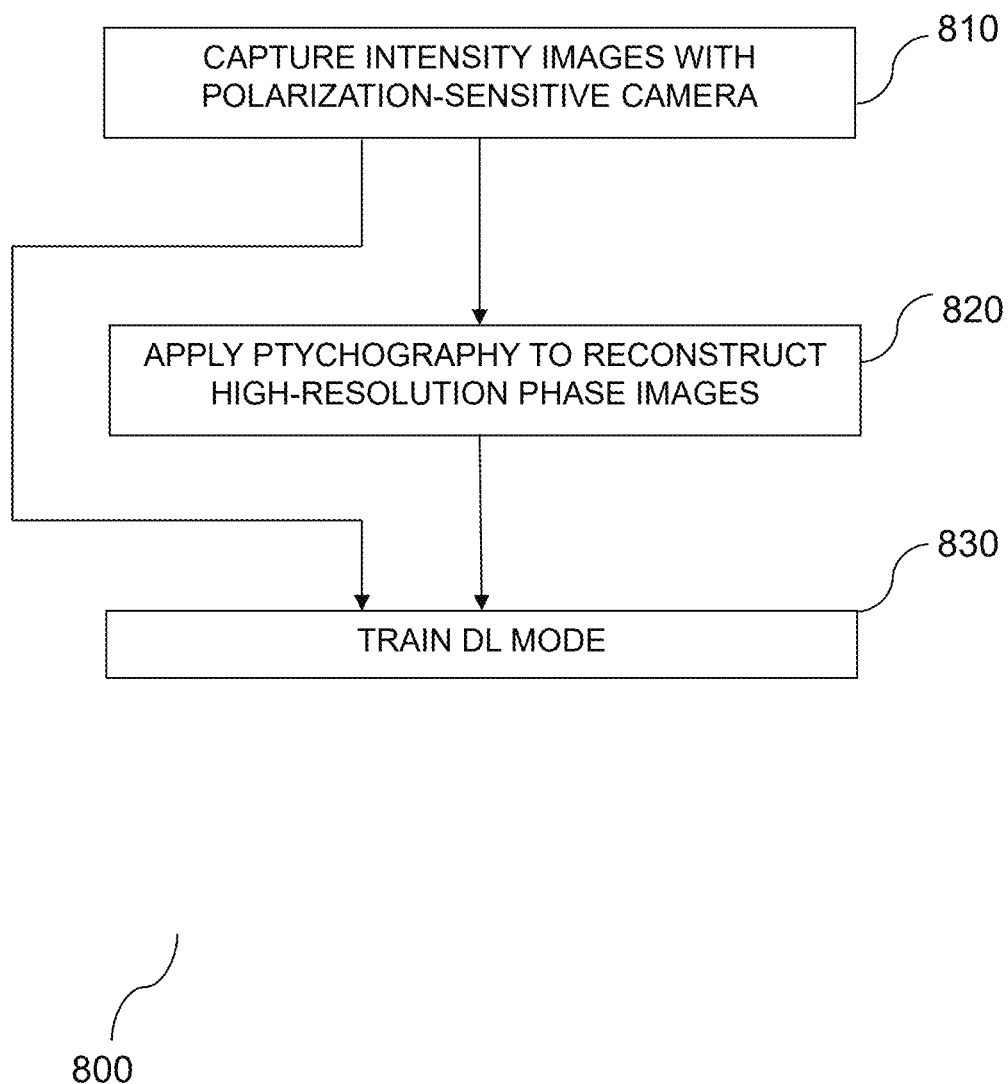
FIG. 8A depicts an exemplary flow chart for dual-mode methods to reconstruct high-resolution phase images from intensity images captured with a polarization-sensitive camera using ptychography and deep learning, according to aspects of certain embodiments of the present invention.
Figure 8B:
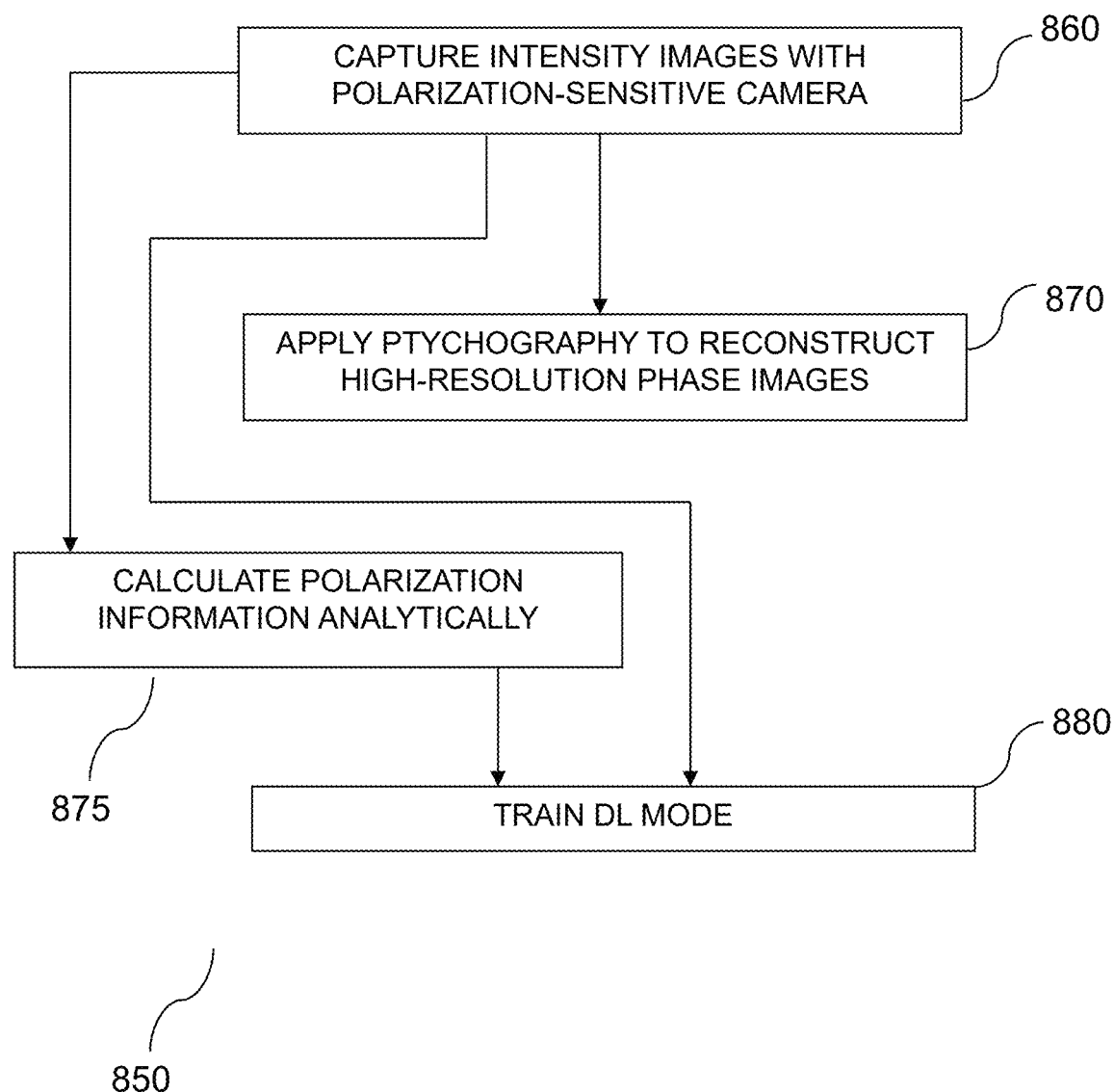
FIG. 8B depicts an exemplary flow chart for dual-mode methods to reconstruct high-resolution phase images and calculate polarization information from intensity images captured with a polarization-sensitive camera using ptychography and deep learning, according to aspects of certain embodiments of the present invention.

As shown in FIGS. 8A and 8B, the normal mode is used to provide data for the DL mode to perform fresh training, semi-training, testing, or inferencing. The microscope computer (190) used in certain embodiments enables the development of an inferencing deep learning pipeline to provide near real-time monitoring. To implement near real-time monitoring, a physics-guided DL model is employed to speed up the DL-based FPM reconstruction by using multiplexed LEDs (which reduce the data acquisition time) and the fast reconstruction ability of inferencing model. This enhances the overall throughput of the system.

In certain embodiments, for the DL mode, a computational imaging data driven model using deep convolutional neural networks ("CNNs") known to skilled artisans is used to reconstruct high-resolution images using a predefined number and location of LEDs within dome LED array (110) and having inferencing capability. A physics-guided conditional generative adversarial network ("cGAN") known to skilled artisans trains how to match low-resolution intensity images to 2D birefringence images. Then, its generator model (modified U-Net architecture known to skilled artisans) is used as an inferencing model on microscope computer (190). The deep CNN techniques in certain embodiments comprise two processes: (1) the simulation process for generating network training data; and (2) the training process.

Figure 7:
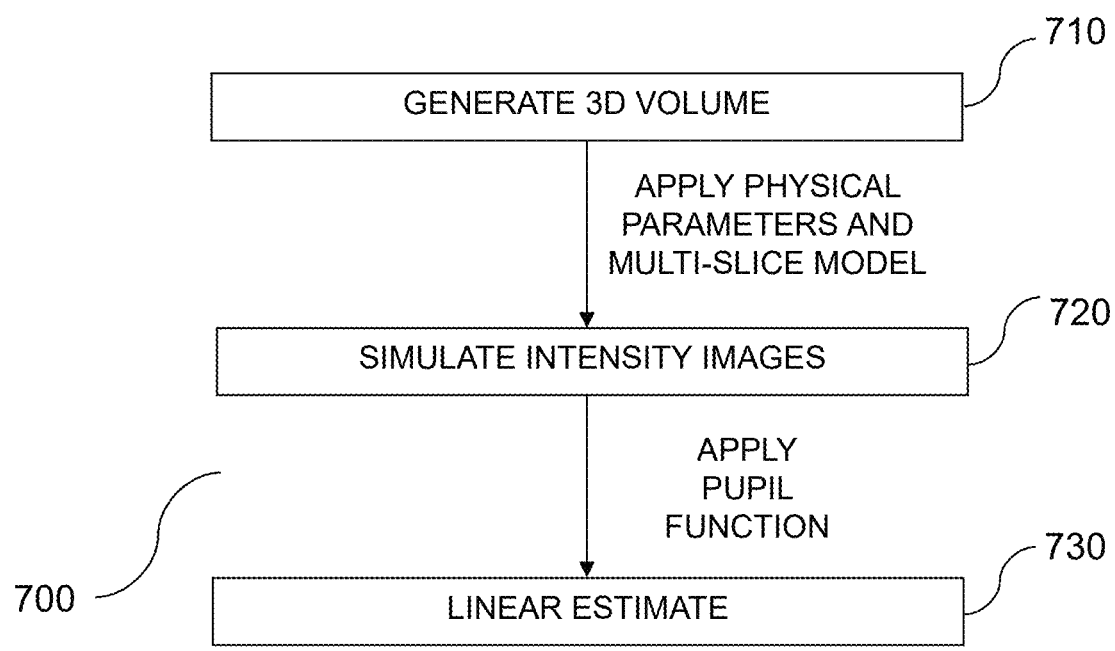
FIG. 7 depicts an exemplary flow chart for simulation methods according to aspects of certain embodiments of the present invention.

FIG. 7 depicts an exemplary flow chart for deep CNN simulation methods according to aspects of certain embodiments of the present invention. In the first step (710), real biological bright-field images are randomly selected, then these images are stacked into 3D volumes, and assigned random but realistic indices of refraction values based on experience to create weak and strong scattering media. After that, at step (720) for each 3D volume, the same physical parameters as the experimental setup (see FIG. 1) are utilized to generate intensity images corresponding to each LED's position in the dome LED array (110). This simulator provides a physical model of an object using a multi-slice beam propagation-based approach. With these intensity images obtained from the simulator, the linear model approximations of the object volume consisting of intensity diffraction images can be obtained (step 730 in FIG. 7) by applying the pupil function of the optical setup.

FIG. 8A depicts an exemplary flow chart (800) for dual-mode methods to reconstruct high-resolution phase images from intensity images captured with a polarization-sensitive camera using ptychography and deep learning, according to aspects of certain embodiments of the present invention. At step 810, intensity images (such as the large image 610 shown in FIG. 6) are captured with a polarization-sensitive camera (such as camera 180 depicted in FIG. 1). Then, at step 820, Fourier vector ptychography methods are applied to the captured images, as described herein, to reconstruct high-resolution phase images (such as the image 640 on the lower-right portion of FIG. 6). At step 830, the DL mode is trained with a sufficiently large set of captured intensity images (from multiple executions of step 810 with different samples) along with the corresponding resulting reconstructed high-resolution phase images (from multiple executions of step 820). Once trained, microscope systems according to aspects of the present invention in certain embodiments can operate in the DL mode, such that step 820 can be skipped. In other words, once trained and operating in DL mode, microscope systems according to aspects of the present invention in certain embodiments generate estimates of high-resolution phase images for a given set of intensity images captured with the polarization-sensitive camera, thus eliminating the computationally intensive Fourier vector ptychography methods of step 820 as described herein.

FIG. 8B depicts an exemplary flow chart (850) for dual-mode methods to reconstruct high-resolution phase images and calculate polarization information from intensity images captured with a polarization-sensitive camera using ptychography and deep learning, according to aspects of certain embodiments of the present invention. At step 860, intensity images (such as the large image 610 shown in FIG. 6) are captured with a polarization-sensitive camera (such as camera 180 depicted in FIG. 1). Then, at step 870, Fourier vector ptychography methods are applied to the captured images, as described herein, to reconstruct high-resolution phase images (such as the image 640 on the lower-right portion of FIG. 6). At step 875, high-resolution polarization information associated with the captured images is calculated analytically. At step 880, the DL mode is trained with a sufficiently large set of captured intensity images (from multiple executions of step 860 with different samples) along with the corresponding resulting reconstructed high-resolution phase images (from multiple executions of step 870) and the polarization information that was calculated analytically at step 875. Once trained, microscope systems according to aspects of the present invention in certain embodiments can operate in the DL mode, such that steps 870 and 875 can be skipped. In other words, once trained and operating in DL mode, microscope systems according to aspects of the present invention in certain embodiments generate estimated reconstructed high-resolution phase images and associated polarization information for a given set of intensity images captured with the polarization-sensitive camera, thus eliminating the computationally intensive Fourier vector ptychography methods and analytic polarization information calculation methods of steps 870 and 875 as described herein.

Figure 8C:
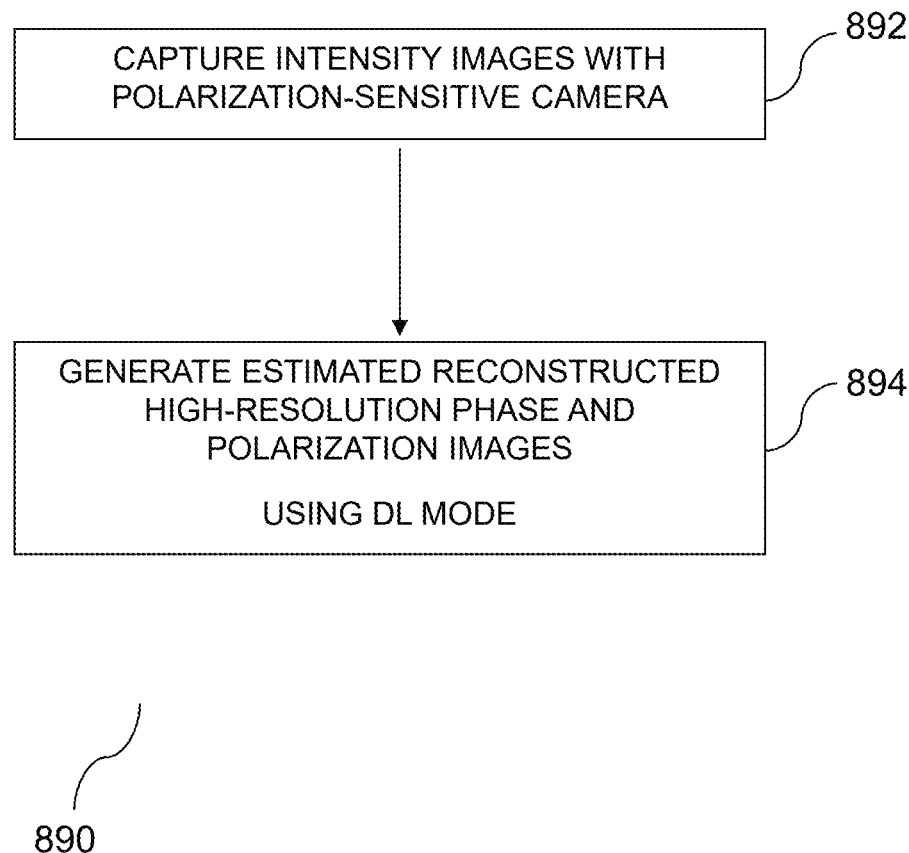
FIG. 8C depicts an exemplary flow chart for dual-mode methods to generated estimated reconstructed high-resolution phase images and polarization information from intensity images captured with a polarization-sensitive camera using ptychography and deep learning, according to aspects of certain embodiments of the present invention.

FIG. 8C depicts an exemplary flow chart (890) for dual-mode methods to generate estimated reconstructed high-resolution phase images and polarization information from intensity images captured with a polarization-sensitive camera using ptychography and deep learning, according to aspects of certain embodiments of the present invention. Once trained and operating in DL mode, at step 892, intensity images are captured with a polarization-sensitive camera, for example using the system configurations and techniques described herein. At step 894, the captured intensity images comprise the input to methods as described herein to generate estimated reconstructed high-resolution phase images and polarization information using DL mode.

Thus, in the DL mode, the captured intensity diffraction images are used as the network inputs for training. The training process enables the microscope system according to aspects of the present invention in certain embodiments to reconstruct 2D birefringence images, which include information about retardance, orientation axis, and diattenuation.

Figure 9:
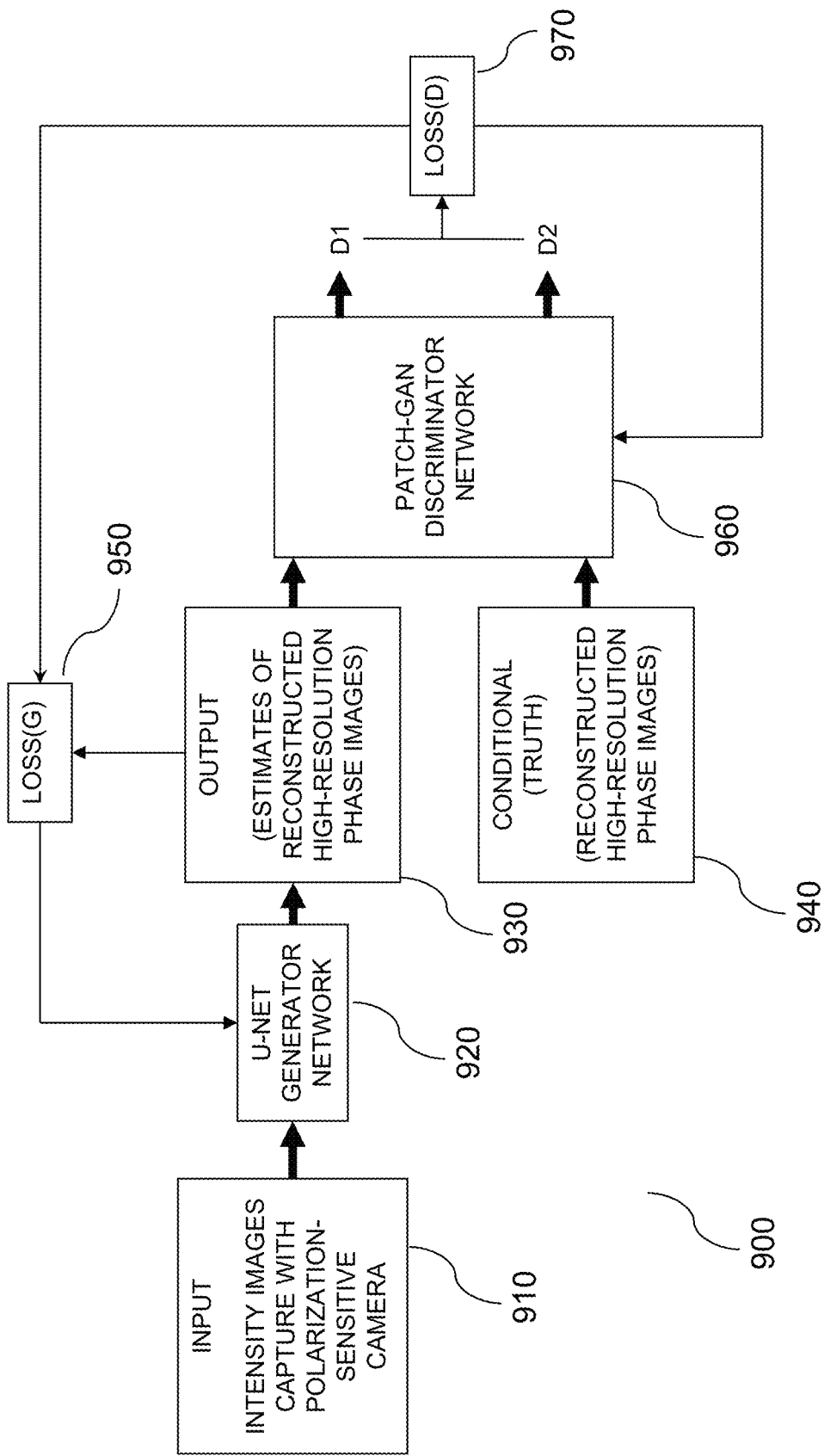
FIG. 9 depicts an exemplary block diagram for a conditional generative adversarial network ("cGAN") architecture to reconstruct high-resolution phase images from intensity images captured with a polarization-sensitive camera using deep learning, according to aspects of certain embodiments of the present invention.

FIG. 9 depicts an exemplary block diagram for a conditional generative adversarial network ("cGAN") architecture to reconstruct high-resolution phase images from intensity images captured with a polarization-sensitive camera using deep learning, according to aspects of certain embodiments of the present invention. At the input (910), intensity images captured with a polarization-sensitive camera (such as camera 180 depicted in FIG. 1) are fed into U-Net Generator Network (920), which produces estimates (930) of the reconstructed high-resolution phase images that would have resulted from vectorial Fourier ptychography methods as described herein. The output (930) is compared by Patch-GAN discriminator network (960) with the conditional/truth input (940), i.e., the set of actual reconstructed high-resolution phase images that resulted from vectorial Fourier ptychography methods as described herein. The outputs of Patch-GAN discriminator network (960) are fed into a Loss (D) function (970), the output of which feeds back to Patch-GAN discriminator network (960) and to a Loss (G) function (950). Loss (G) function (950) also receives as an input the output of the estimate module (930). The output of Loss (G) function (950) is used as a feedback/training signal to U-Net Generator Network (920).

Certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions that execute on the computer or other programmable apparatus create structures for implementing the functions specified in the flow chart block or blocks. These computer program instructions may also be stored in computer-readable memory that can direct a computer or other programmable apparatus to function in a particular manner, such that the instructions stored in computer-readable memory produce an article of manufacture including instruction structures that implement the function specified in the flow chart block or blocks. The computer program instructions may also be loaded onto a computer or other programmable apparatus to cause a series of operational steps to be performed on the computer or other programmable apparatus to produce a computer-implemented process such that the instructions that execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems that perform the specified functions or steps, or combinations of special purpose hardware and computer instructions.

For example, any number of computer programming languages, such as C, C++, C#(CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

In the foregoing descriptions, certain embodiments are described in terms of particular data structures, preferred and optional enforcements, preferred control flows, and examples. Other and further application of the described methods, as would be understood after review of this application by those with ordinary skill in the art, are within the scope of the invention.

The term "machine-readable medium" should be understood to include any structure that participates in providing data that may be read by an element of a computer system. Such a medium may take many forms, including but not limited to, non-volatile media, volatile media, and transmission media. Non-volatile media include, for example, optical or magnetic disks and other persistent memory such as devices based on flash memory (such as solid-state drives, or SSDs). Volatile media include dynamic random access memory (DRAM) and/or static random access memory (SRAM). Transmission media include cables, wires, and fibers, including the wires that comprise a system bus coupled to a processor. Common forms of machine-readable media include, for example and without limitation, a floppy disk, a flexible disk, a hard disk, a solid-state drive, a magnetic tape, any other magnetic medium, a CD-ROM, a DVD, or any other optical medium.

As used herein, the term "computer system" is defined to include one or more processing devices (such as a central processing unit ("CPU") or graphics processing unit ("GPU")) for processing data and instructions that are coupled with one or more data storage devices for exchanging data and instructions with the processing unit, including, but not limited to, RAM, ROM, internal SRAM, on-chip RAM, on-chip flash, CD-ROM, hard disks, and the like. Examples of computer systems include everything from a controller to a laptop or desktop computer, to a supercomputer. The data storage devices can be dedicated, i.e., coupled directly with the processing unit, or remote, i.e., coupled with the processing unit over a computer network. It should be appreciated that remote data storage devices coupled to a processing unit over a computer network can be capable of sending program instructions to the processing unit for execution. In addition, the processing device can be coupled with one or more additional processing devices, either through the same physical structure (e.g., a parallel processor), or over a computer network (e.g., a distributed processor.). The use of such remotely coupled data storage devices and processors will be familiar to those of skill in the computer science arts. The term "computer network" as used herein is defined to include a set of communications channels interconnecting a set of computer systems that can communicate with each other. The communications channels can include transmission media such as, but not limited to, twisted pair wires, coaxial cable, optical fibers, satellite links, or digital microwave radio. The computer systems can be distributed over large, or "wide," areas (e.g., over tens, hundreds, or thousands of miles, WAN), or local area networks (e.g., over several feet to hundreds of feet, LAN). Furthermore, various local-area and wide-area networks can be combined to form aggregate networks of computer systems.

Figure 10:
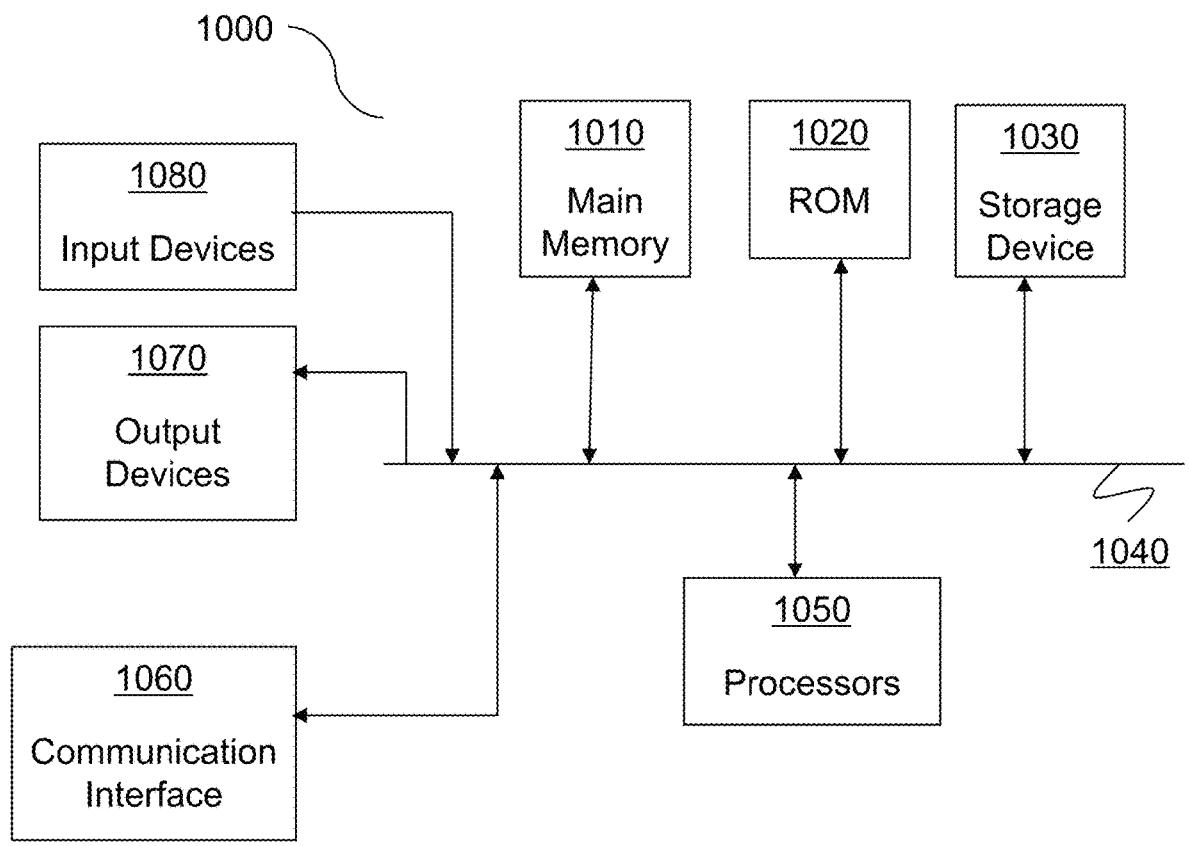
FIG. 10 depicts a block diagram of a microscope computer according to aspects of certain embodiments of the present invention.

FIG. 10 is an exemplary block diagram of a computing system 1000 that may be used to implement aspects of certain embodiments of the present invention (such as microscope computer 190 depicted in FIG. 1). Computing device 1000 may include, without limitation, a bus 1040, one or more processors 1050, main memory 1010, a read-only memory (ROM) 1020, a storage device 1030, one or more input devices 1080, one or more output devices 1070, and a communication interface 1060. Bus 1040 may include, without limitation, one or more conductors that permit communication among the components of computing device 1000.

Processors 1050 may include, without limitation, any type of conventional processors, microprocessors, CPUs, GPUs, or processing logic that interprets and executes instructions. Main memory 1010 may include, without limitation, a random-access memory (RAM) or another type of dynamic storage device that stores information and instructions for execution by processor 1050. ROM 1020 may include, without limitation, a conventional ROM device or another type of static storage device that stores static information and instructions for use by processors 1050. Storage device 1030 may include, without limitation, a magnetic and/or optical recording medium and its corresponding drive.

Input device(s) 1080 may include, without limitation, one or more conventional mechanisms that permit a user to input information to computing device 1000, such as a keyboard, a mouse, a pen, a stylus, handwriting recognition, voice recognition, biometric mechanisms, touch screen, and the like. Output device(s) 1070 may include, without limitation, one or more conventional mechanisms that output information to the user, including a display, a printer, a speaker, and the like. Communication interface 1060 may include, without limitation, any transceiver-like mechanism that enables computing device 1000 to communicate with other devices and/or systems. For example, communication interface 1060 may include, without limitation, mechanisms for communicating with another device or system via a network.

As described in detail herein, computing device 1000 may perform operations based on software instructions that may be read into memory 1010 from another computer-readable medium, such as data storage device 1030, or from another device via communication interface 1060. The software instructions contained in memory 1010 cause one or more processors 1050 to perform processes that are described elsewhere. Alternatively, hardwired circuitry may be used in place of, or in combination with, software instructions to implement processes consistent with the present invention. Thus, various implementations are not limited to any specific combination of hardware circuitry and software.

Details regarding the foregoing components, which may be implemented in a single computing device or distributed among multiple computing devices, are described throughout this document.

While the above description contains many specifics and certain exemplary embodiments have been described and shown in the accompanying drawings, it is to be understood that such embodiments are merely illustrative of, and not restrictive on, the broad invention, and that this invention is not to be limited to the specific constructions and arrangements shown and described, since various other modifications may occur to those ordinarily skilled in the art, as mentioned above. The invention includes any combination or sub-combination of the elements from the different species and/or embodiments disclosed herein.

What is claimed is:

1. A microscope system comprising:
a dome light-emitting diode ("LED") array comprising a non-coplanar plurality of planar LED arrays, wherein at least two of said non-coplanar plurality of planar LED arrays are non-parallel, wherein each of said planar LED arrays comprises a plurality of LEDs, and wherein an intensity of each of said plurality of said LEDs is controllable by a microscope computer coupled to said dome LED array;
a plurality of optical elements configured to receive and process the optical output of said dome LED array, wherein said plurality of optical elements comprises a bandpass filter tuned to an emission frequency of said LEDs and one or more liquid crystal variable retarders (LCRs) controllable by said microscope computer coupled to said one or more LCRs to generate polarized light directed at a specimen holder; and
an objective for collecting said polarized light after passing through a specimen coupled to said specimen holder and for directing said collected polarized light to a polarization-sensitive camera comprising a polarization filter and an image sensor for generating digitized image data;
wherein said polarization-sensitive camera transmits said digitized image data to said microscope computer for image reconstruction and analysis.

2. The microscope system of claim 1, wherein said digitized image data comprises a plurality of intensity images associated with a portion of said specimen.

3. The microscope system of claim 2, wherein said microscope computer transmits a plurality of LED intensity control signals to said dome LED array and a plurality of LCR control signals to said LCR to generate said plurality of intensity images.

4. The microscope system of claim 3, wherein said microscope computer applies Fourier ptychography to said plurality of intensity images to generate a plurality of reconstructed high-resolution phase images associated with said portion of said specimen.

5. The microscope system of claim 3, wherein said microscope computer applies vectorial Fourier ptychography to said plurality of intensity images to generate a plurality of reconstructed high-resolution phase images associated with said portion of said specimen.

6. The microscope system of claim 4, wherein said microscope computer processes said plurality of intensity images and said plurality of reconstructed high-resolution phase images to train a conditional generative adversarial network to generate a plurality of estimates of said reconstructed high-resolution phase images.

7. The microscope system of claim 5, wherein said microscope computer processes said plurality of intensity images and said plurality of reconstructed high-resolution phase images to train a conditional generative adversarial network to generate a plurality of estimates of said reconstructed high-resolution phase images.

8. The microscope system of claim 1, wherein said specimen comprises a liquid sample and said specimen holder is integrated with a microfluidic device.

9. The microscope system of claim 2, wherein said specimen comprises a liquid sample and said specimen holder is integrated with a microfluidic device.

10. The microscope system of claim 3, wherein said specimen comprises a liquid sample and said specimen holder is integrated with a microfluidic device.

11. The microscope system of claim 4, wherein said specimen comprises a liquid sample and said specimen holder is integrated with a microfluidic device.

12. The microscope system of claim 5, wherein said specimen comprises a liquid sample and said specimen holder is integrated with a microfluidic device.

13. The microscope system of claim 6, wherein said specimen comprises a liquid sample and said specimen holder is integrated with a microfluidic device.

14. The microscope system of claim 7, wherein said specimen comprises a liquid sample and said specimen holder is integrated with a microfluidic device.

15. A microscope system comprising:
a dome light-emitting diode ("LED") array comprising a plurality of LEDs, wherein the plurality of LEDs are in a first array of LEDs having a first plane and in at least a second array of LEDs having a second plane, wherein the first plane and the second plane are non-parallel, and wherein an intensity of each of said plurality of said LEDs is controllable by a microscope computer coupled to said dome LED array;
a plurality of optical elements configured to receive and process the optical output of said dome LED array, wherein said plurality of optical elements comprises a bandpass filter tuned to an emission frequency of said LEDs and one or more liquid crystal variable retarders (LCRs) controllable by said microscope computer coupled to said one or more LCRs to generate polarized light directed at a specimen holder; and
an objective for collecting said polarized light after passing through a specimen coupled to said specimen holder and for directing said collected polarized light to a polarization-sensitive camera comprising a polarization filter and an image sensor for generating digitized image data;

wherein said polarization-sensitive camera transmits said digitized image data to said microscope computer for image reconstruction and analysis.

16. The microscope system of claim 15, wherein said digitized image data comprises a plurality of intensity images associated with a portion of said specimen.

17. The microscope system of claim 16, wherein said microscope computer transmits a plurality of LED intensity control signals to said dome LED array and a plurality of LCR control signals to said LCR to generate said plurality of intensity images.

18. The microscope system of claim 17, wherein said microscope computer applies Fourier ptychography to said plurality of intensity images to generate a plurality of reconstructed high-resolution phase images associated with said portion of said specimen.

19. The microscope system of claim 18, wherein said microscope computer applies vectorial Fourier ptychography to said plurality of intensity images to generate a plurality of reconstructed high-resolution phase images associated with said portion of said specimen.

20. The microscope system of claim 18, wherein said microscope computer processes said plurality of intensity images and said plurality of reconstructed high-resolution phase images to train a conditional generative adversarial network to generate a plurality of estimates of said reconstructed high-resolution phase images.

21. The microscope system of claim 19, wherein said microscope computer processes said plurality of intensity images and said plurality of reconstructed high-resolution phase images to train a conditional generative adversarial network to generate a plurality of estimates of said reconstructed high-resolution phase images.

22. The microscope system of claim 15, wherein said specimen comprises a liquid sample and said specimen holder is integrated with a microfluidic device.

23. The microscope system of claim 16, wherein said specimen comprises a liquid sample and said specimen holder is integrated with a microfluidic device.

24. The microscope system of claim 17, wherein said specimen comprises a liquid sample and said specimen holder is integrated with a microfluidic device.

25. The microscope system of claim 18, wherein said specimen comprises a liquid sample and said specimen holder is integrated with a microfluidic device.

26. The microscope system of claim 19, wherein said specimen comprises a liquid sample and said specimen holder is integrated with a microfluidic device.

27. The microscope system of claim 20, wherein said specimen comprises a liquid sample and said specimen holder is integrated with a microfluidic device.

28. The microscope system of claim 21, wherein said specimen comprises a liquid sample and said specimen holder is integrated with a microfluidic device.

29. A Fourier ptychography microscope method, comprising the steps of:
    capturing a plurality of intensity images of a portion of a specimen coupled to a specimen holder with a polarization-sensitive camera coupled to a microscope computer; and
    generating a plurality of estimates of said reconstructed high resolution phase images and polarization information with a trained conditional generative adversarial network,
    wherein said trained conditional generative adversarial network generates said plurality of estimates of said reconstructed high resolution phase images and polarization information based on said plurality of intensity images, a plurality of reconstructed high-resolution phase images generated by applying Fourier vectorial ptychography to said plurality of intensity images, and polarization information calculated based on said plurality of intensity images.

30. The Fourier ptychography microscope method of claim 29, wherein said capturing step comprises transmitting a plurality of LED intensity control signals to a dome LED array that illuminates a portion of said specimen and a plurality of LCR control signals to an LCR that processes the optical output of said dome LED array.

31. The Fourier ptychography microscope method of claim 30, wherein said capturing step comprises transmitting a set of digitized image data associated with said plurality of intensity images from said polarization-sensitive camera to said microscope computer.

32. A Fourier ptychography microscope method, comprising the steps of:
    capturing a plurality of intensity images of a portion of a specimen coupled to a specimen holder with a polarization-sensitive camera coupled to a microscope computer;
    applying Fourier vectorial ptychography to said plurality of intensity images to generate a plurality of reconstructed high-resolution phase images;
    calculating a set of polarization information associated with said plurality of intensity images; and
    training a conditional generative adversarial network to generate a plurality of estimates of said reconstructed high-resolution phase images and of said set of polarization information based on said plurality of intensity images, said plurality of reconstructed high-resolution phase images, and said set of calculated polarization information.

33. The Fourier ptychography microscope method of claim 32, wherein said capturing step comprises transmitting a plurality of LED intensity control signals to a dome LED array that illuminates a portion of said specimen and a plurality of LCR control signals to an LCR that processes the optical output of said dome LED array.

34. The Fourier ptychography microscope method of claim 33, wherein said capturing step comprises transmitting a set of digitized image data associated with said plurality of intensity images from said polarization-sensitive camera to said microscope computer.

\* \* \* \* \*